US011433596B2

(12) United States Patent
Teicher et al.

(10) Patent No.: US 11,433,596 B2
(45) Date of Patent: Sep. 6, 2022

(54) SYSTEM AND METHOD FOR THREE-DIMENSIONAL PRINTING

(71) Applicant: STRATASYS LTD., Rehovot (IL)

(72) Inventors: Mordechai Teicher, Hod Hasharon (IL); Gershon Miller, Rehovot (IL)

(73) Assignee: STRATASYS LTD., Rehovot (IL)

( * ) Notice: Subject to any disclaimer, the term of this patent is extended or adjusted under 35 U.S.C. 154(b) by 420 days.

(21) Appl. No.: 16/662,488

(22) Filed: Oct. 24, 2019

(65) Prior Publication Data

US 2020/0055300 A1 Feb. 20, 2020

Related U.S. Application Data

(63) Continuation of application No. 15/437,178, filed on Feb. 20, 2017, now Pat. No. 10,493,744, which is a
(Continued)

(51) Int. Cl.
*B29C 64/112* (2017.01)
*B33Y 10/00* (2015.01)
(Continued)

(52) U.S. Cl.
CPC .......... *B29C 64/112* (2017.08); *B29C 64/129* (2017.08); *B29C 64/135* (2017.08);
(Continued)

(58) Field of Classification Search
CPC ... B29C 64/112; B29C 64/129; B29C 64/135; B29C 64/40; B29C 64/227; B29C 64/264; B29C 64/393; B33Y 10/00; B33Y 50/02
See application file for complete search history.

(56) References Cited

U.S. PATENT DOCUMENTS 6,500,378 B1   12/2002  Smith
7,052,263 B2   5/2006   John
(Continued)

FOREIGN PATENT DOCUMENTS

EP   1-852-244 A2   11/2007
EP   2-199-082 A1   7/2010
(Continued)

OTHER PUBLICATIONS

Office Action dated Dec. 29, 2017 for corresponding U.S. Appl. No. 15/437,178.
(Continued)

*Primary Examiner* — Leith S Shafi
(74) *Attorney, Agent, or Firm* — Pearl Cohen Zedek Latzer Baratz LLP

(57) ABSTRACT

An apparatus for preparing a two-dimensional layer of a three-dimensional object during three-dimensional printing of the object. The apparatus may include a controller; a transparent substrate for receiving a deposited layer of liquid materials on an upper surface thereof; a selective deposition unit that deposits at least one liquid body material and a liquid support material different from the at least one liquid body material, on the transparent substrate according to signals received from the controller; and a selective curing unit that selectively solidifies, by curing irradiation, a portion of the deposited layer of liquid body materials on the transparent substrate according to signals received from the controller, such that some of the liquid body material remains uncured.

18 Claims, 8 Drawing Sheets

Related U.S. Application Data continuation of application No. 13/826,731, filed on Mar. 14, 2013, now Pat. No. 9,573,321.

(51) Int. Cl.
  *B33Y 50/02* (2015.01)
  *B29C 64/40* (2017.01)
  *B29C 64/129* (2017.01)
  *B29C 64/135* (2017.01)

(52) U.S. Cl.
  CPC .............. *B29C 64/40* (2017.08); *B33Y 10/00* (2014.12); *B33Y 50/02* (2014.12)

(56) References Cited

U.S. PATENT DOCUMENTS

| | | |
|---|---|---|
| 7,364,686 B2 | 4/2008 | Kritchman et al. |
| 9,573,321 B2 | 2/2017 | Teicher |
| 2007/0257055 A1* | 11/2007 | Scott ..................... B29C 64/106 222/71 |
| 2008/0231731 A1 | 9/2008 | Hull |
| 2009/0304952 A1* | 12/2009 | Kritchman ............. B33Y 10/00 427/256 |
| 2010/0140849 A1 | 6/2010 | Comb |

FOREIGN PATENT DOCUMENTS

| | | | |
|---|---|---|---|
| WO | WO 2012/140658 A2 | 10/2012 | |
| WO | WO-2012140658 A2 * | 10/2012 | .......... B29C 67/007 |

OTHER PUBLICATIONS

Office Action dated Nov. 2, 2018 for corresponding U.S. Appl. No. 15/437,178.

* cited by examiner

SYSTEM AND METHOD FOR THREE-DIMENSIONAL PRINTING

CROSS REFERENCE TO RELATED APPLICATIONS

This application is a continuation of U.S. patent application Ser. No. 15/437,178, filed Feb. 20, 2017, which is a continuation of U.S. patent application Ser. No. 13/826,731, filed Mar. 14, 2013, now U.S. Pat. No. 9,573,321, the contents of which are incorporated herein in their entirety.

BACKGROUND

Three-dimensional printing is used to fabricate relatively small objects for prototyping and custom-manufacturing in a variety of fields. Three-dimensional printing processes typically fabricate an object layer upon layer, such that each sequential layer is shaped according to a respective cross section of the object.

Some objects that are to be fabricated by three-dimensional printing incorporate overhanging regions that need to be supported during fabrication. In such cases, a three-dimensional printing process simultaneously fabricates both an object body structure and a support structure, any of which may be present in each layer. The support structure is removed after fabrication of the object is complete.

Three-dimensional printing technologies of special interest include selective deposition or selective curing.

In selective deposition, a computer-controlled liquid dispenser, such as an inkjet printing head, deposits a new layer of liquid material upon a surface, e.g. a previously-deposited cross section layer. Each layer includes an object body cross section and, if necessary, a support cross section. "Selective deposition" is so-named because the dispenser accurately places tiny droplets of material according to a two-dimensional image of the object body cross section, and, if needed, tiny droplets of support material according to the support structure cross section. For the body of the fabricated object, the deposited material is typically a photopolymer that is solidified by being irradiated with curing radiation during the printing process. The curing radiation is usually in the ultraviolet portion of the spectrum, for solidifying the polymer. Alternatively, a deposited material, such as a wax, may be liquefied by heat for deposition, and allowed to solidify by natural cooling after being deposited in place. The term "curing" herein denotes a chemical process by which a liquid photopolymer is solidified.

In selective curing, a high-resolution image of the two-dimensional object body cross section is projected by an image projector onto a thin, uniform layer of liquid photopolymer, thereby selectively solidifying the projected cross section. Non-limiting examples of image projectors include: Digital Light Processing (DLP) projectors using UV sources; and scanning UV lasers. "Selective curing" is so-named because the cross section is shaped by accurately curing only those portions which are to be solidified according to the desired cross section, for example by UV curing as just described. In some known methods of selective curing, the current cross section layer is added at the top of the object body being fabricated, at the surface of a liquid polymer in a trough, or alternatively at the bottom of an object body being fabricated and which is suspended in a trough with a transparent bottom, through which the cross section layer image is projected for curing a thin layer of liquid at the bottom. Where supporting structures are necessary to suspend overhanging or hollow parts of the object body, these are implemented as thin strings or pillars of build material selectively cured during the same printing process. The support strings are broken and removed after fabricating the body is completed.

Selective deposition allows the use of multiple materials with different properties, which enables fabricating:
  support structures that are easy-to-remove by dissolution or melting, and
  parts of the object body with diverse colors and/or mechanical properties and/or other properties.

Selective curing offers advantages including:
  faster printing; and
  allowing the use of slurries of solid particles (such as particles of metal or ceramic) suspended in liquid polymer, which cannot be accurately dispensed via the printing heads used for selective deposition.

Selective curing, however, currently has certain limitations, notably the limitation of being able to use only a single material.

The techniques and components for selective deposition and selective curing as described herein for use in embodiments of the present invention are well-known in the field, and are described herein for purposes of reference.

SUMMARY

Embodiments of the present invention combine the respective advantages of selective deposition and selective curing into three-dimensional printing methods and apparatus.

Certain embodiments of the invention provide a two-step printing process, wherein:
  a thin layer of liquid photopolymer is selectively deposited according to a predetermined cross section pattern on a transparent surface or substrate;
  the transparent substrate is moved towards the body of the object being fabricated so that the liquid polymer layer is brought into contact with the body of the object being fabricated; and
  the thin photopolymer layer is selectively cured according to the predetermined cross section pattern, by irradiation via a high-resolution image of curing light passed through the transparent substrate.

According to various embodiments of the invention, the cross section pattern is contained in a predetermined two-dimensional image which includes a body region corresponding to the three-dimensional object body structure, and a support region corresponding to the three-dimensional support structure. In a related embodiment of the invention, the predetermined two-dimensional image is calculated according to any well-known method in the field, and is received in a suitable data format, in which the body region and support region are distinct from one another. In another related embodiment, a body region and/or a support region includes multiple distinct non-contiguous areas.

Therefore, according to an embodiment of the present invention, there is provided a method for preparing a two-dimensional layer of a three-dimensional object during a three-dimensional printing of the object, the three-dimensional object including a body structure and a support structure, the method including: (a) receiving two-dimensional image data of a cross section of the three-dimensional object, the image including a body region and a support region, wherein the support region is distinct from the body region; (b) selectively depositing, on a transparent substrate, a layer that includes at least a first liquid photopolymer body material which covers and encloses the body region cross section, and a liquid support material that is different from the first liquid photopolymer body material and which covers and encloses the support region cross section; and (c) selectively solidifying the first liquid photopolymer body material, and optionally the liquid support material, by irradiating the layer with curing radiation through the transparent substrate according to the body region, such that some of the liquid body material remains uncured.

In addition, according to another embodiment of the present invention, there is provided an apparatus for preparing a two-dimensional layer of a three-dimensional object during a three-dimensional printing of the object, wherein the three-dimensional object includes a body structure and a support structure, the apparatus including: (a) a controller; (b) a transparent substrate for receiving a deposited layer of liquid materials on an upper surface thereof; (c) a selective deposition unit that deposits at least one liquid body material and a liquid support material different from the at least one liquid body material, on the transparent substrate according to signals received from the controller; and (d) a selective curing unit that selectively solidifies, by curing irradiation, a portion of the deposited layer of liquid body materials on the transparent substrate according to signals received from the controller, such that some of the liquid body material remains uncured.

Furthermore, according to yet another embodiment of the present invention, there is provided an apparatus for preparing a two-dimensional layer of a three-dimensional object during a three-dimensional printing of the object, wherein the three-dimensional object includes a body structure and a support structure, the apparatus including: (a) a controller; (b) a UV-transparent substrate for receiving a deposited layer of liquid materials on an upper surface thereof; (c) a selective deposition unit arranged to deposit at least one liquid body material and a liquid support material that is different from the at least one liquid body material, on the UV-transparent substrate according to signals received from the controller; and (d) a UV light projector for providing UV light to selectively solidify, by curing, a portion of the deposited layer of liquid body materials on the UV-transparent substrate, according to signals received from the controller; and (e) a non-transitory storage unit containing machine-readable instructions, which instructions, when executed by the controller, cause the controller to: (1) receive two-dimensional image data of a cross section of the three-dimensional object, the image including a body region and a support region, wherein the support region is distinct from the body region; (2) send to the selective deposition unit signals for selectively depositing, on a transparent substrate, a layer that includes at least a first liquid photopolymer body material which covers and encloses the body region, and a liquid support material that is different from the first liquid photopolymer body material and which covers and encloses the support region; and (3) send to the selective curing unit signals for selectively solidifying the first liquid photopolymer body material by irradiating the layer with curing radiation through the transparent substrate according to the body region.

Definitions

The term "three-dimensional object" or "object" herein denotes an item which is built, layer-by-layer, by a three-dimensional printing process. The object consists of an "object body", or "body", which is the desired end-product of the printing process, and a "support structure", or "support", which temporarily supports overhanging or hollow portions of the body during printing, and is removed upon completion of the printing process. It is noted that although the body and support are defined in the singular, one or both of the body and support may include a plurality of distinct parts which may be functionally related, for example when printing a gear; or they may be unrelated, for example when producing several unrelated bodies in a single printing batch. It is also noted that, depending on the printing technology, an object may be printed using a single material, or two or more materials that convey different physical and/or chemical properties to different parts of the finished object.

The term "cross section" herein denotes a two-dimensional region of a plane representing the intersection of a plane with a solid object. The region includes one or more distinct shapes. The term "contour" herein denotes a closed border or boundary enclosing a two-dimensional region or shape. It is noted that when a region includes a plurality of shapes, the contour of the region will include several closed lines that do not connect or intersect with one another.

The term "bitmap" is typically used in the field to denote a two-dimensional image which specifies a cross-sectional layer of the object being fabricated. However, in related fields such as computer-aided design, the term "bitmap" denotes a particular class of two-dimensional image formats. Therefore, the present disclosure employs the term "two-dimensional image" to denote any data that serves to define a cross section of an object.

Standard Tessellation Language ("STL") is a commonly-used formalism for specifying solid objects from which two-dimensional cross sections (or "slices") may be derived in a pre-printing stage of a three-dimensional printing process. A cross-sectional image or slice derived from any three-dimensional object representation, including those of STL, is herein denoted as a "two-dimensional" image or a "cross section" regardless of the specific data format used.

The term "transparent" herein denotes a material or item through which light images may be projected while retaining usable quality and intensity, including light in the ultraviolet portion of the spectrum.

The terms "cure", "curing", "cured", and the like herein denote the irradiating of a photo-sensitive liquid material, typically a photopolymer, and the resulting solidification of the liquid material as a result of the irradiating. The term "curing radiation" herein denotes light radiation capable of curing a particular liquid material, including light in at least the ultraviolet (UV) portion of the spectrum. The term "uncured" herein denotes a photo-sensitive liquid material which has not been solidified by irradiating. The terms "liquid" and "liquid material" herein denote a substantially incompressible fluid, including, but not limited to: photopolymer substances; heterogeneous mixtures of photopolymer substances with other substances in solution and/or insoluble particulate substances in suspension, such as slurries and similar combinations. According to various embodiments of the invention as disclosed herein, irradiating with curing radiation is performed by projecting a two-dimensional image of UV curing radiation through a substrate that is transparent to the UV curing radiation, i.e., a UV transparent substrate.

The term "selectively solidifying" herein denotes the use of selective curing, as described herein, to effect the selective solidification of a liquid material. The term "selective deposition" herein denotes deposition of a liquid material in selected points or areas.

The terms "project", "projected", "projecting", "projection", and the like herein denote the formation, by optical apparatus, of a real light image, typically in the ultraviolet (UV) portion of the spectrum. The terms "image projector" and "projector" herein denote such optical apparatus.

BRIEF DESCRIPTION OF THE DRAWINGS

The subject matter disclosed may best be understood by reference to the following detailed description when read with the accompanying drawings in which.

Figure 1:
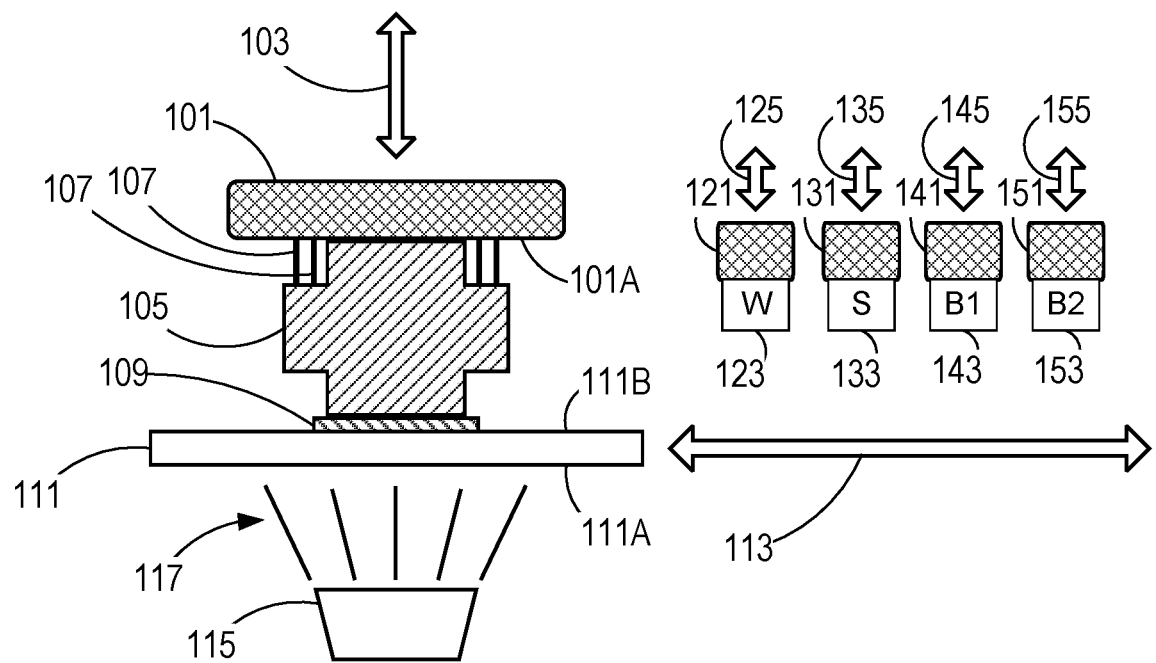
FIG. 1 conceptually illustrates apparatus for forming a layer of an object according to an embodiment of the present invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

In the following description, various embodiments of the present invention are disclosed. For purposes of illustration, certain well known features may be omitted or simplified.

FIG. 1 conceptually illustrates apparatus for forming a layer of an object according to certain embodiments of the present invention. An elevator platform 101 provides a lower surface 101A on which a fabricated object 105 is formed and to which fabricated object body 105 is attached during the fabrication process. In some embodiments of the invention, elevator platform 101 moves vertically in precisely-controlled distance increments, as indicated by a direction 103. Support structures 107 hold or support other structures such as overhanging portions of layers during fabrication. A new object body layer 109 is shown in an intermediate stage of processing, as disclosed herein.

In some embodiments, a transparent table or substrate 111 having a bottom surface 111A and a top surface 111B is precisely positioned vertically, and is movable horizontally in precisely-controlled distance increments, as indicated by a direction 113. In one embodiment of the invention, substrate 111 moves horizontally in a linear fashion; in another embodiment, substrate 111 moves horizontally in a non-linear fashion, such as by being rotated or pivoted about a vertical axis. Substrate 111 is transparent to curing radiation for solidifying liquid materials used in fabricating the object, and surfaces 111A and 111B are optically-prepared so that a clear two-dimensional image of a layer cross section can be projected through transparent substrate 111, entering through surface 111A and having a focal plane substantially coincident with surface 111B, in order to perform selective curing of a layer of liquid photopolymer material resting on surface 111B.

A projector 115 projects a two-dimensional image of curing radiation 117 through transparent substrate 111, for selective curing of new object body layer 109, as detailed herein. In related embodiments of the invention, projector 115 is implemented by devices including, but not limited to: a DLP projector with an ultraviolet light source; and a scanned ultraviolet laser.

A wiper actuator 121 carries a wiper 123 ("W") and moves in a vertical direction 125 perpendicular to transparent substrate 111. Wiper 123 is used to clean surface 111B of transparent substrate 111 by removing uncured liquid body material and support material from surface 111B. The term "wiper" herein denotes an element or component of apparatus that cleans transparent substrate 111 of residual uncured liquid body material and support material by any means, including, but not limited to: wiping; scraping; cutting; abrading; washing; dissolving; suction; and vaporizing.

A support material printer actuator 131 carries a support printer 133 ("S") and moves in a vertical direction 135 perpendicular to transparent substrate 111. Support printer 133 is used to deposit a cross section layer of an uncured/unhardened support material on surface 111B of transparent substrate 111.

A first body material printer actuator 141 carries a first body material printer 143 ("B1") and moves in a vertical direction 145 perpendicular to transparent substrate 111. First body material printer 143 is used to deposit a cross section layer of an uncured first liquid body material on surface 111B of transparent substrate 111. According to various embodiments of the present invention, this selective deposition process is achieved by use of ink-jet technologies, and in a related embodiment, clog-resistant Continuous Ink Jet (CIJ) technology is used for liquids prone to clogging.

A second body material printer actuator 151 carries a second body material printer 153 ("B2") and moves in a vertical direction 155 perpendicular to transparent substrate 111. Second body material printer 153 is used to deposit a cross section layer of an uncured second liquid body material on surface 111B of transparent substrate 111.

In a related embodiment of the invention, actuators 121, 131, 141, and 151 also move in a horizontal direction (not shown) parallel to transparent substrate 111; and in another related embodiment, actuators 121, 131, 141, and 151 also move horizontally in two orthogonal directions (not shown) parallel to transparent substrate 111. Actuators and positioning devices described herein may be implemented by well-known means of computer-controlled motion activation and positioning, such as motors, solenoids, and the like.

In the non-limiting case illustrated in FIG. 1, there are two different, distinct liquid body materials, B1 and B2. Other embodiments of the invention feature different numbers of different, distinct body materials. The ability to combine multiple different body materials is one of the advantages of selective deposition, and is one benefit of embodiments of the present invention.

As noted herein, according to a further embodiment of the invention, multiple separate three-dimensional solid objects are printed independently and simultaneously by the same apparatus. In a non-limiting example, a small solid object may have cross sections that are small in comparison with the area of transparent substrate 111, so that an array of many instances of the same object may be fabricated simultaneously according to a two-dimensional cross section image of the array. Doing so increases the production throughput of the apparatus in a mass-production manufacturing environment. In another non-limiting example, the small objects are not instances of the same object, but are related objects, such as components for further assembly into a larger, more complex assemblage. In still another non-limiting example, the small objects are unrelated and are fabricated simultaneously to improve manufacturing efficiency and to optimize equipment utilization.

Figure 2:
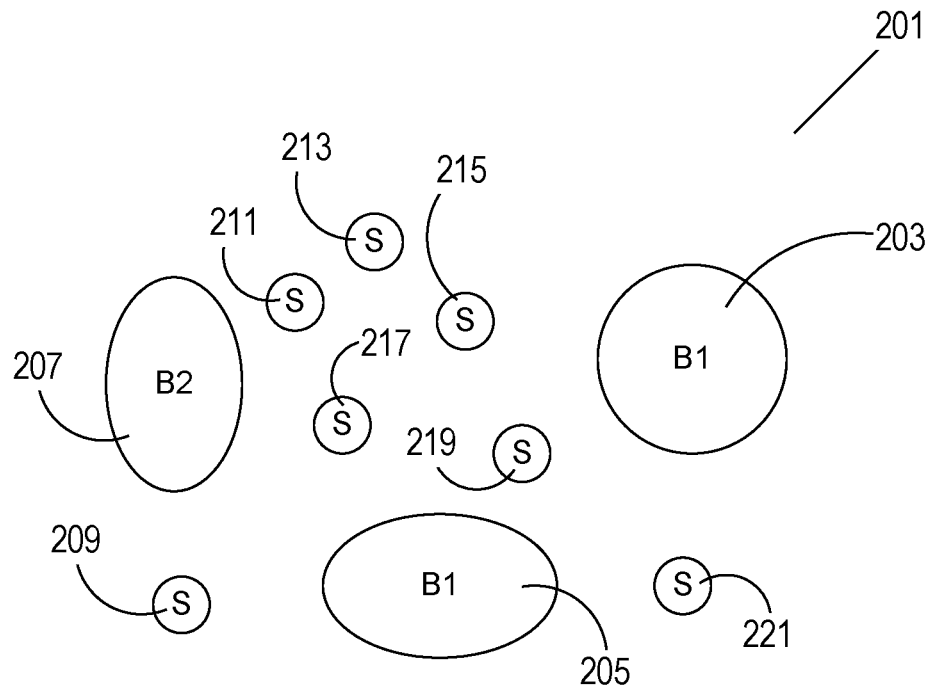
FIG. 2 conceptually illustrates a two-dimensional cross-sectional image plan for a layer of an object body according to an embodiment of the present invention.

FIG. 2 conceptually illustrates a non-limiting example of a two-dimensional cross-sectional image 201 for a layer of an object body, such as fabricated object 105. Two-dimensional image 201 is that of a cross section plan for fabricated object 105 and support structures 107, as output, for example, by a computer-aided design process. The term "plan" herein denotes a graphical design or specification for a cross section of fabricated object 105. A cross section 203 and a cross section 205 are specified to be fabricated of body material B1 in the shapes and boundaries shown; and a cross section 207 is specified to be fabricated of body material B2 in the shape and boundary shown. Support cross sections 209, 211, 213, 215, 217, 219, and 221 are specified to be fabricated of support material S in the shapes and boundaries shown.

It is noted that the appended drawings emphasize different aspects of various embodiments of the present invention, and thus the features of the two-dimensional cross sections as illustrated in FIGS. 2, 4, 6, 8A, and 8B are not intended to correspond visually to the features of solid fabricated object 105 and support structures 107 as illustrated in FIGS. 1, 3, 5, 7, and 9.

Figure 3:
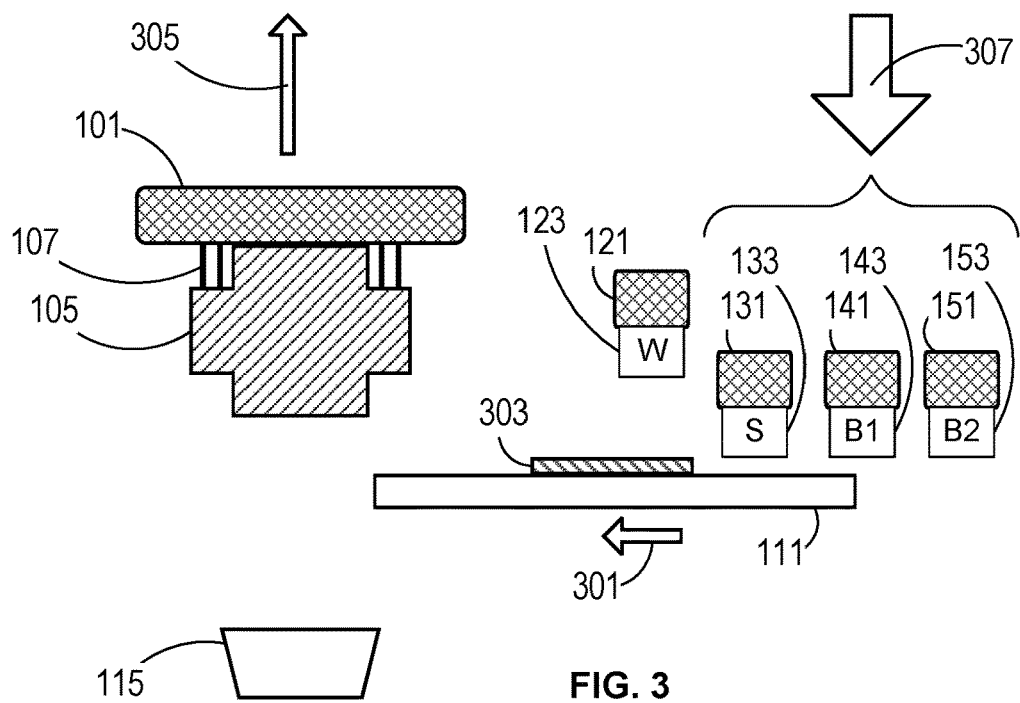
FIG. 3 conceptually illustrates a configuration of the apparatus of FIG. 1 performing a selective deposition of a liquid photopolymer layer on a transparent substrate according to an embodiment of the present invention.

FIG. 3 conceptually illustrates a configuration of the apparatus of FIG. 1 after performing a selective deposition of an uncured liquid photopolymer and support layer 303 on transparent substrate 111 according to an embodiment of the present invention. Wiper actuator 121 has been maintained in a raised position as shown, so that wiper 123 is inactive. Support material printer actuator 131, first body material printer actuator 141, and second body material printer actuator 151 have been moved downward in a direction 307 so that support material printer 133, first body material printer 143, and second body material 153 are actively positioned for printing on transparent substrate 111, and are shown as having just deposited uncured liquid photopolymer and support layer 303. Subsequent to the deposition, transparent substrate 111 is shown as being moved in a direction 301 for positioning under fabricated object 105, which has been raised by elevator 101 in a direction 305, to allow for proper positioning of transparent substrate 111 and uncured liquid photopolymer and support layer 303.

Figure 4:
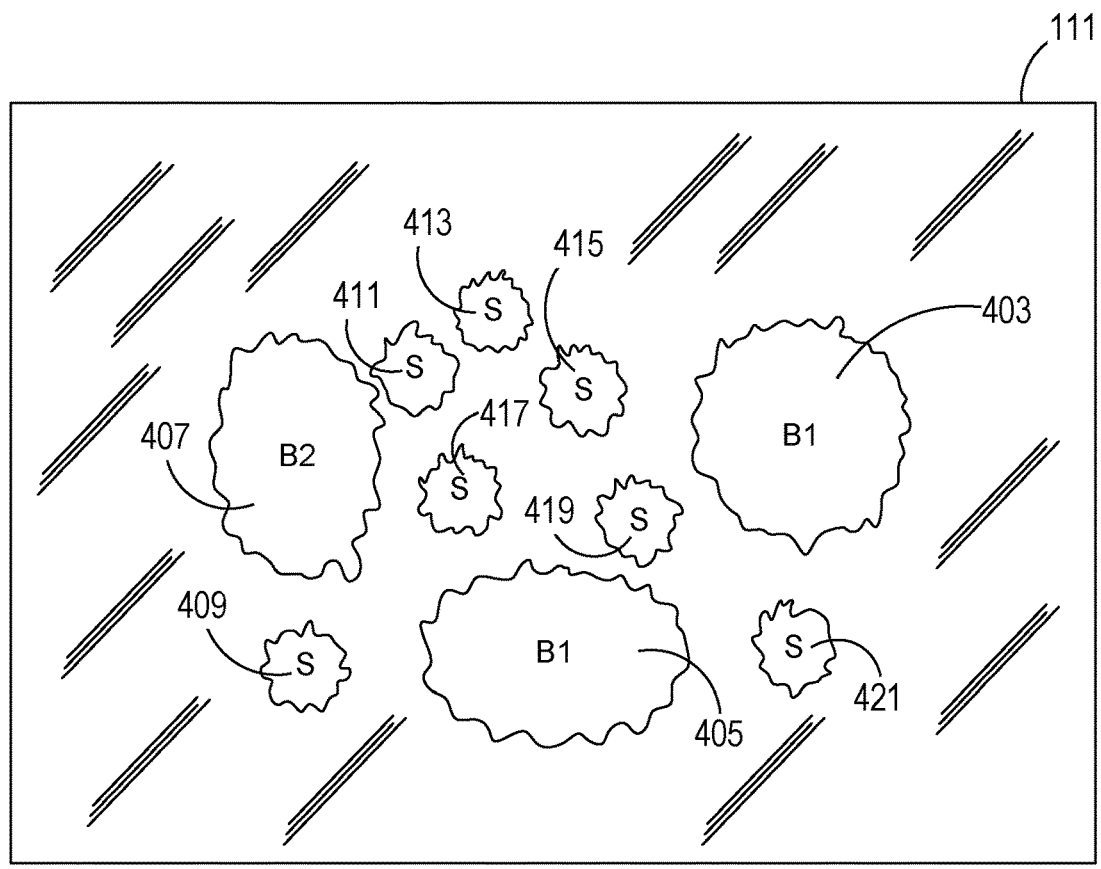
FIG. 4 conceptually illustrates the selectively-deposited liquid photopolymer layer of FIG. 3 on the transparent substrate according to an embodiment of the present invention, as viewed through the transparent substrate.

FIG. 4 conceptually illustrates a two-dimensional cross section of selectively-deposited liquid photopolymer layer 303 (as previously shown in FIG. 3) on transparent substrate 111 according to an embodiment of the present invention, as viewed through transparent substrate 111. A first uncured liquid body material deposit 403 corresponds to, and encloses, first body material cross section 203 (FIG. 2) on transparent substrate 111. Likewise, a first uncured liquid body material deposit 405 corresponds to, and encloses, first body material cross section 205 on transparent substrate 111; and a second uncured liquid body material deposit 407 corresponds to, and encloses, second body material cross section 207 on transparent substrate 111. According to this embodiment, the second liquid body material is different from the first liquid body material, so that the finished fabricated object includes regions of different solid materials. In a non-limiting example, the first and second body materials can be of different color. In another non-limiting example, a first body material is entirely polymer, a second body material is a polymer matrix with embedded ceramic particles, and a third body material is a polymer matrix with embedded metallic particles.

Uncured support material deposits 409, 411, 413, 415, 417, 419, and 421 respectively correspond to, and enclose, support cross sections 209, 211, 213, 215, 217, 219, and 221 on transparent substrate 111. The term "enclose" with reference to a deposited material and a cross section herein denotes that the deposited material covers at least the entire region within the cross section including the contour of the cross section, and covers some area outside the cross section contour with excess material deposited as well. That is, only a portion of the deposited liquid body material is cured, and some of the deposited liquid body material remains uncured on transparent substrate 111 after curing by curing radiation. In an embodiment of the invention, liquid support material is different from liquid body material.

Subsequent Figures, as discussed herein, show how the high resolution of selective curing is combined with selective deposition to produce finished surfaces of high precision.

Figure 5:
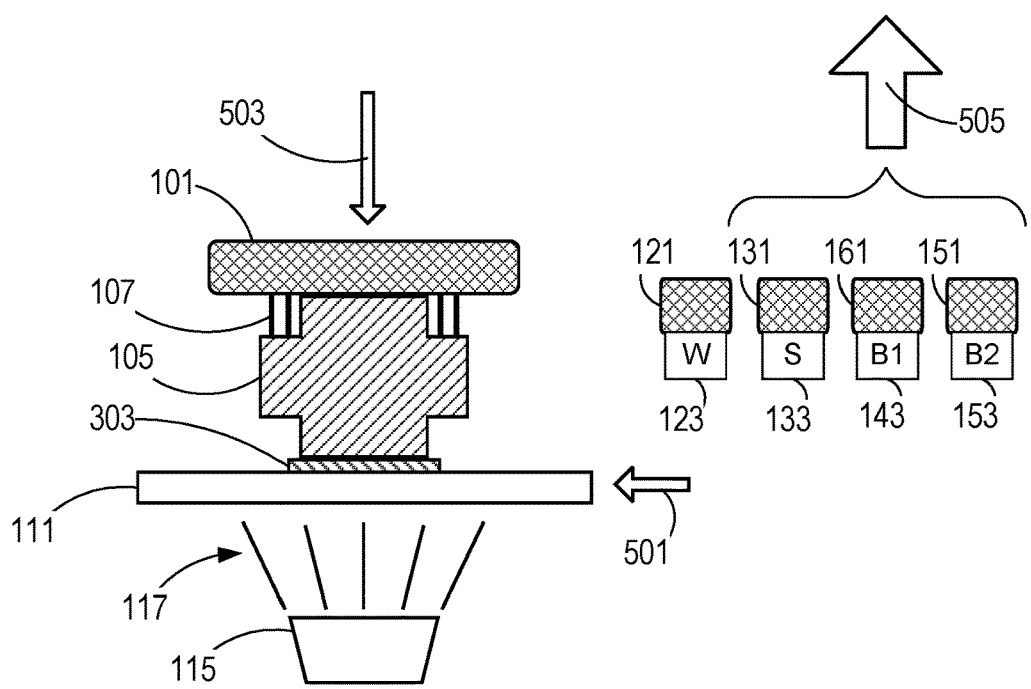
FIG. 5 conceptually illustrates a configuration of the apparatus of FIG. 1 performing a selective curing of the liquid photopolymer body material and support layer of FIG. 4 on the object being fabricated according to an embodiment of the present invention.

FIG. 5 conceptually illustrates a configuration of the apparatus of FIG. 1 performing a selective curing of liquid photopolymer and support layer 303 on object body 105 according to an embodiment of the present invention. Transparent substrate 111 with layer 303 thereon has been moved in a direction 501 to a position in registration with object body 105. The terms "register" and "registration" herein denote a condition of correct alignment or proper relative position between layer 303 and object body 105. After that, elevator platform 101 with object body 105 and supports 107 attached thereto is lowered in a direction 503 so that object body 105 is brought into contact with layer 303 and in registration therewith. In a related embodiment of the invention, support material printer actuator 131, first body material printer actuator 141, and second body material printer actuator 151 are moved upward in a direction 505 so that support material printer 133, first body material printer 143, and second body material 153 are out of active position.

When object body 105 is in contact with layer 303, projector 115 projects two-dimensional image of curing radiation 117 through transparent substrate 111, for selective solidification of layer 303 according to the selective curing operation.

Figure 6:
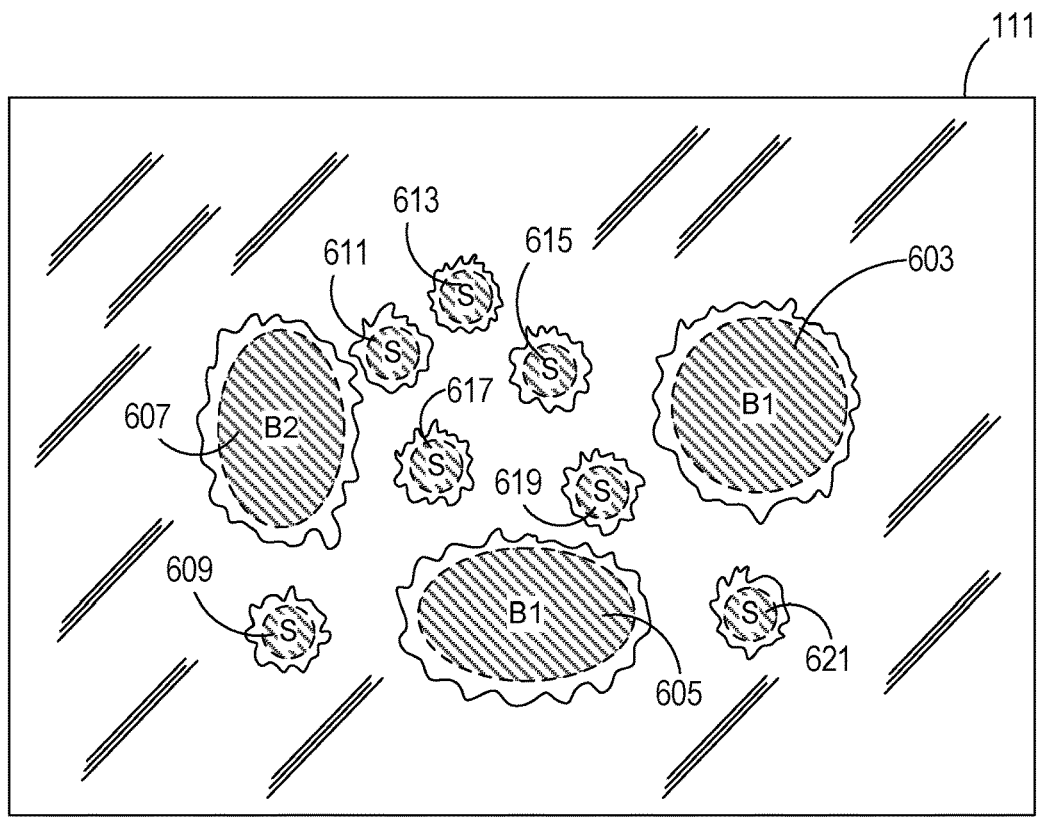
FIG. 6 conceptually illustrates the selectively-cured photopolymer body material and support layer of FIG. 5 on the object being fabricated as seen through the transparent substrate according to an embodiment of the present invention.

FIG. 6 conceptually illustrates a selective curing of photopolymer and support layer 303 of FIG. 5 on object body 105 as seen through transparent substrate 111 according to an embodiment of the present invention. (Hatched areas of FIG. 6 represent cured regions of body material or support material.) A first cured body material deposit 603 corresponds to first body material cross section 203 of FIG. 2. Likewise, a first cured body material deposit 605 corresponds to first body material cross section 205; and a second cured body material deposit 607 corresponds to second body material region 207. Cured support material deposits 609, 611, 613, 615, 617, 619, and 621 respectively correspond to support cross sections 209, 211, 213, 215, 217, 219, and 221.

Figure 7:
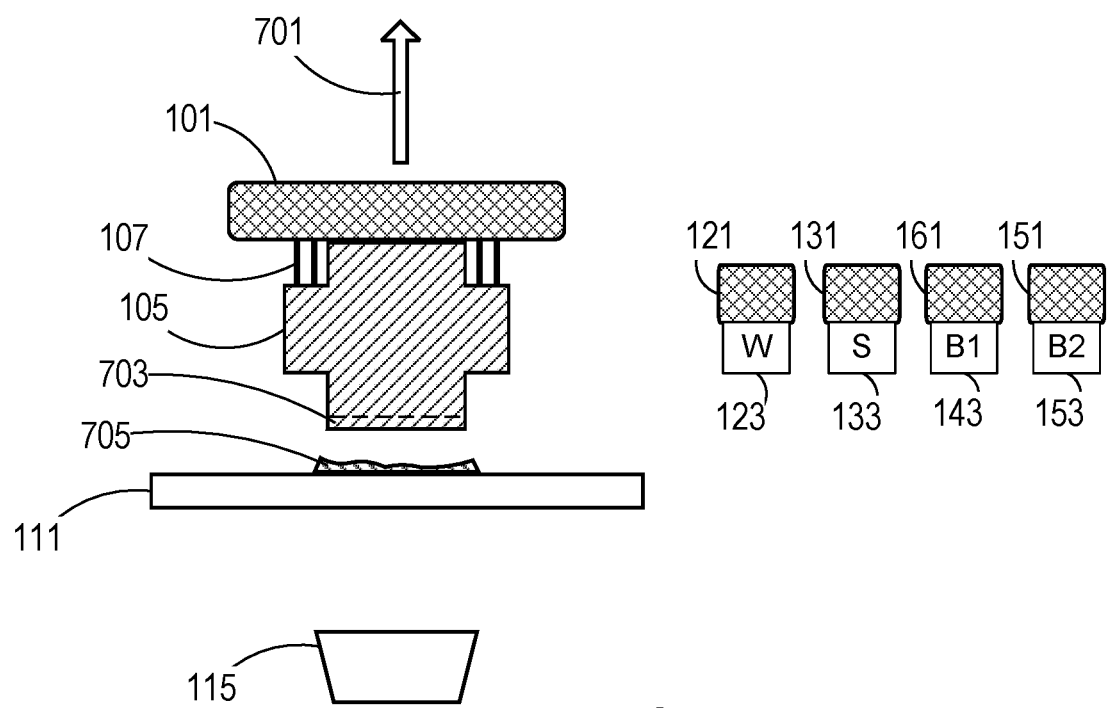
FIG. 7 conceptually illustrates a configuration of the apparatus of FIG. 1 performing a separation of the selectively-cured photopolymer body material and support layer of FIG. 6 from the transparent substrate as an integral part of the object being fabricated according to an embodiment of the present invention.

FIG. 7 conceptually illustrates a configuration of the apparatus of FIG. 1 performing a separation of a selectively-cured photopolymer and support layer 303 of FIG. 5 from transparent substrate 111 according to an embodiment of the present invention. After curing, layer 703 is an integral part of object body 105. Separation is effected as elevator platform 101 with object body 105 and supports 107 attached thereto is raised in a direction 701 so that object body 105 with layer 703 is no longer in contact with transparent substrate 111. A residual layer 705 of uncured liquid body material and liquid support material remains on transparent substrate 111.

Figure 8A:
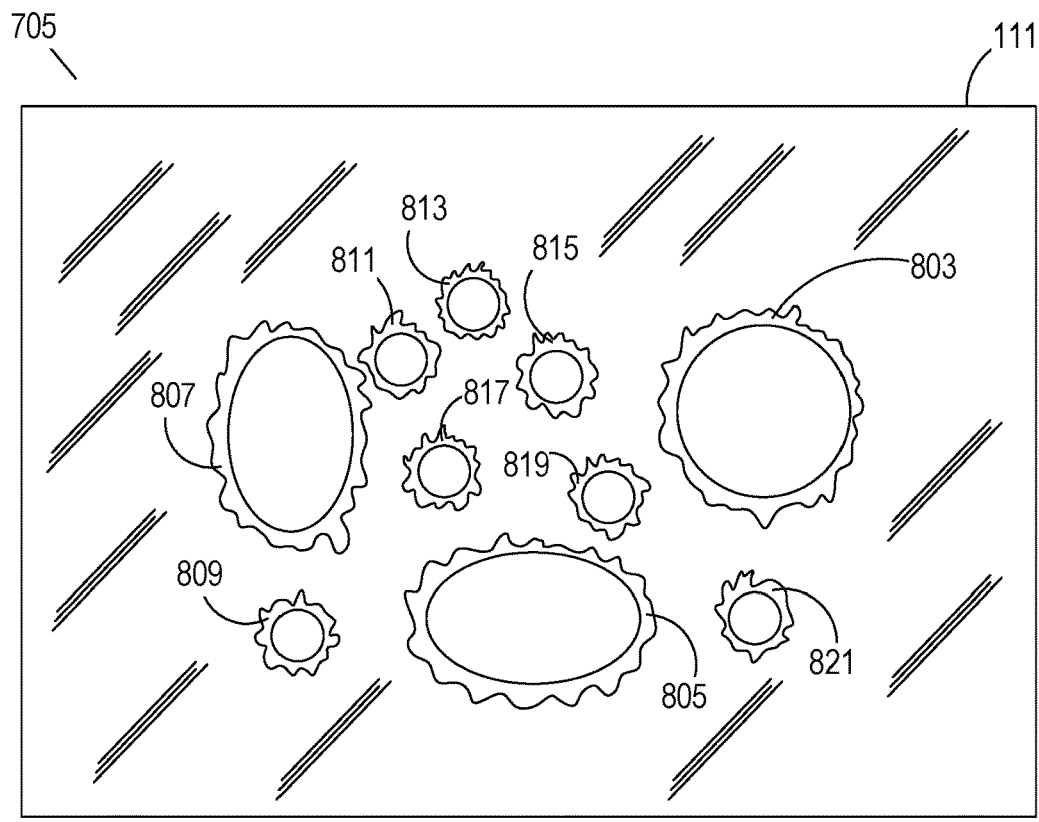
FIG. 8A conceptually illustrates the uncured liquid polymer body material and support material residue on the transparent substrate after the separation of FIG. 7, according to an embodiment of the present invention.

FIG. 8A conceptually illustrates portions of uncured liquid polymer body material and support material residue 705 on transparent substrate 111 after the separation of FIG. 7, according to an embodiment of the present invention. A first uncured body material residue 803 extends outside body region 203 (FIG. 2) and remains uncured subsequent to the irradiating by curing radiation 117 (FIG. 5), and is thus left over from first body material deposit 403 (FIG. 4). Likewise, a first uncured body material residue 805 is left over from first body material deposit 405; and a second uncured body material residue 807 is left over from second body material deposit 407. In this embodiment, uncured support material deposits 809, 811, 813, 815, 817, 819, and 821 respectively are left over from support deposits 409, 411, 413, 415, 417, 419, and 421.

Figure 8B:
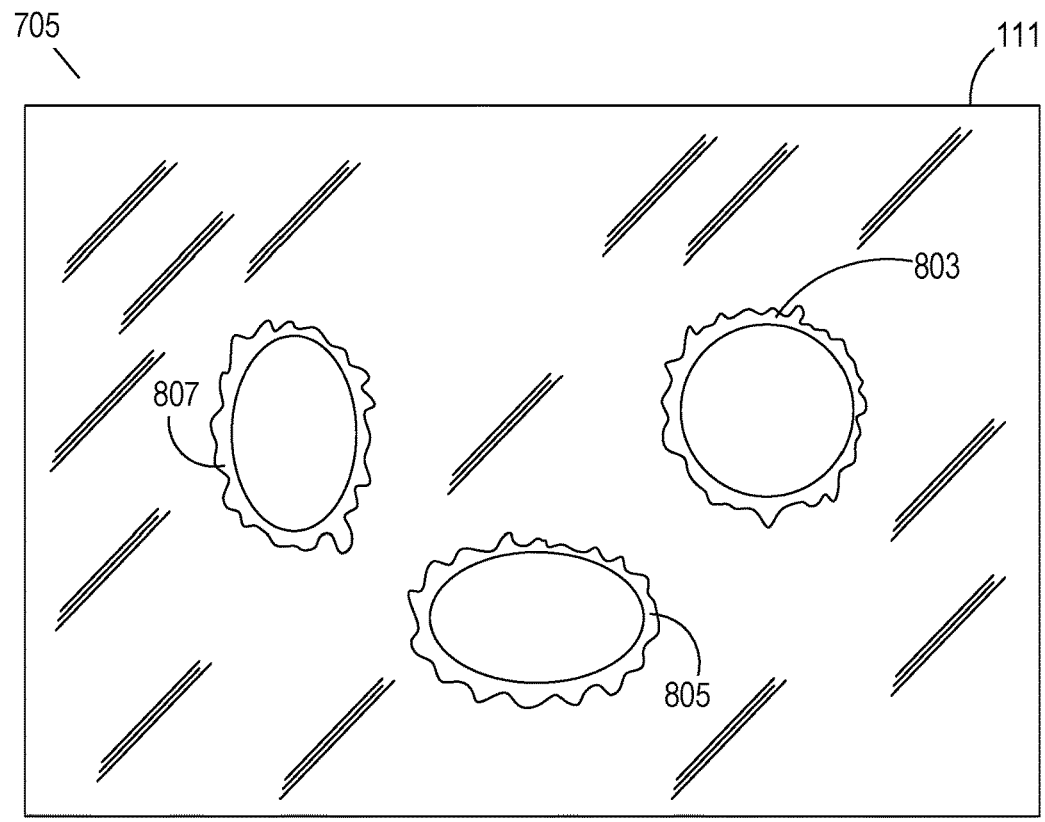
FIG. 8B conceptually illustrates the uncured liquid polymer body material residue on the transparent substrate after the separation of FIG. 7, according to another embodiment of the present invention.

FIG. 8B conceptually illustrates uncured liquid polymer body material residue 705 on transparent substrate 111 after the separation of FIG. 7, according to another embodiment of the present invention. In this embodiment, the support material is not a polymer to be cured, but rather a waxy substance that is liquid above a melting point temperature, but which cools into a solid below the melting point temperature. In another related embodiment, a solid support material is dissolved by a volatile solvent, and solidifies by evaporation of the solvent. Such support materials are not affected by curing radiation 117 and thus do not leave a residue on transparent substrate 111. Instead, in these embodiments the entire support material deposits 409, 411, 413, 415, 417, 419, and 421 (FIG. 4) harden and separate, as shown in FIG. 7. Because the supports are removed after fabrication of the object, the precise shapes and boundaries of support material deposits 409, 411, 413, 415, 417, 419, and 421 are unimportant. Consequently, only first uncured body material residue 803, first uncured body material residue 805, and second uncured body material residue 807 remain on transparent substrate 111.

Figure 9:
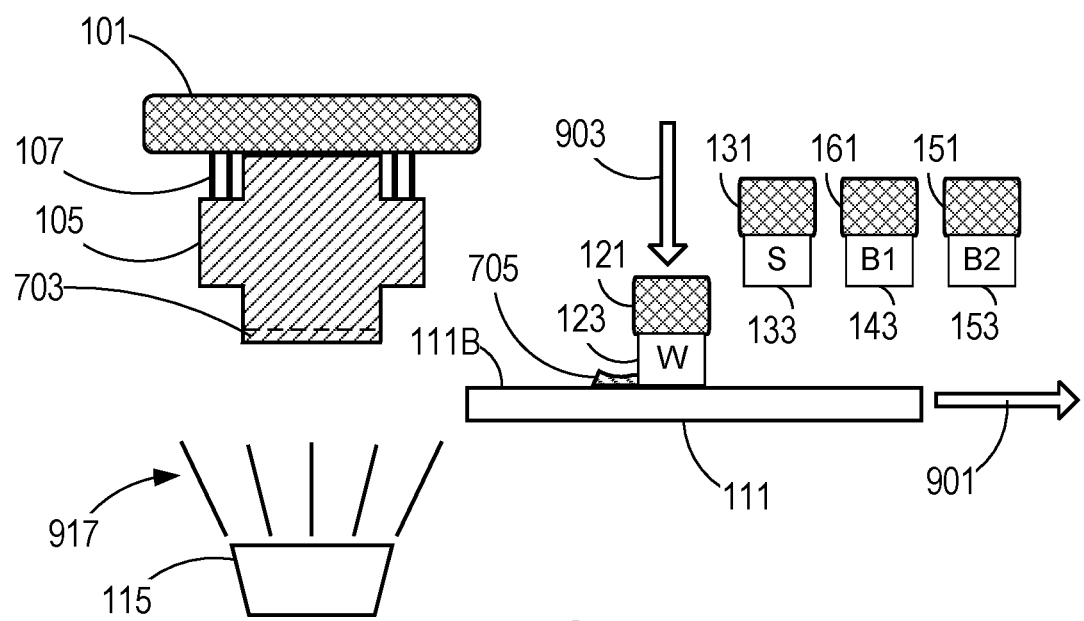
FIG. 9 conceptually illustrates a configuration of the apparatus of FIG. 1 performing a removal of the uncured liquid photopolymer body material and support material residue of FIG. 8A or uncured liquid photopolymer body material residue of FIG. 8B from the transparent substrate according to an embodiment of the present invention.

FIG. 9 conceptually illustrates a configuration of the apparatus of FIG. 1 performing a removal of uncured liquid photopolymer body material and support material residue 705 of FIG. 8A or FIG. 8B from transparent substrate 111 according to an embodiment of the present invention. Transparent substrate 111 is moved in a direction 901 at which point wiper actuator 121 is moved vertically downwards in a direction 903 so that wiper 123 engages surface 11B of transparent substrate 111 to remove residue 705 as shown, in preparation for the deposit of another layer as illustrated in FIG. 3. In a related embodiment of the invention, projector 115 projects additional curing radiation 917 onto object body 105 in a post-curing operation, to further solidify the polymer material of layer 703. Because selective curing is not required for post-curing, in another related embodiment, curing radiation 917 is uniform over object body 105, rather than a focused two-dimensional image.

It is noted that the horizontal and vertical movements of certain components of the apparatus as illustrated and disclosed herein for certain embodiments of the invention pertain to relative movements of the components, and the specific movements described herein are non-limiting. For example, vertical motion 103 of elevator platform 101 (FIG. 1) is relative to the vertical position of transparent substrate 111 and projector 115. In other embodiments of the present invention, elevator platform 101 remains stationary and it is transparent substrate 111 and projector 115 which have vertical motion 103. Likewise, horizontal motion 113 of transparent substrate 111 (FIG. 1) is relative to the horizontal positions of wiper 123, support material printer 133, first body material printer 143, and second body material printer 153. In additional embodiments of the present invention, transparent substrate 111 remains horizontally stationary, and it is wiper 123, support material printer 133, first body material printer 143, and second body material printer 153 which have horizontal motion 113. Thus, apparatus according to various embodiments of the present invention is described in terms of relative motions of components.

Figure 10:
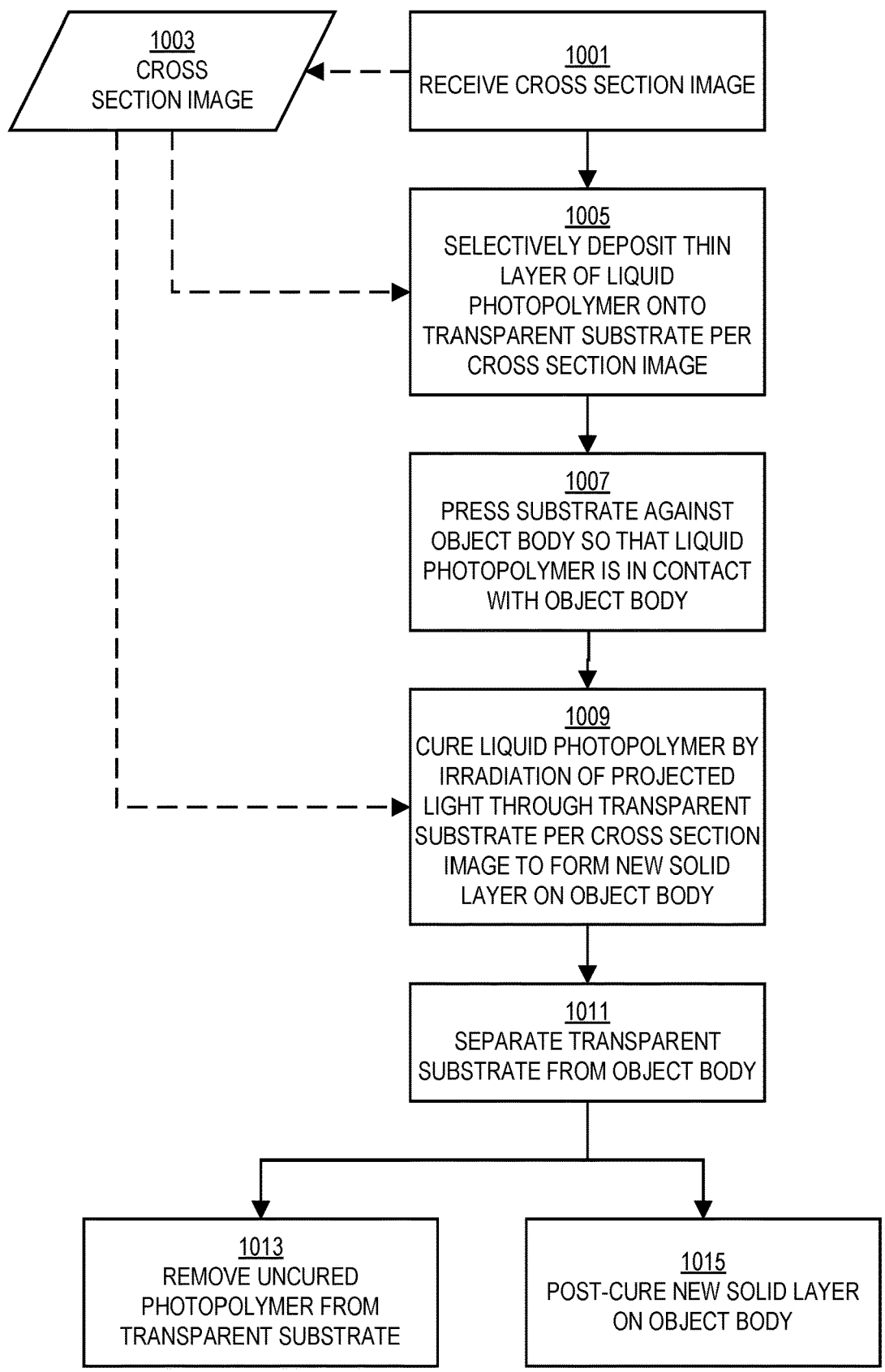
FIG. 10 is a flowchart of a method for preparing a two-dimensional layer of an object during a three-dimensional printing of the object, according to an embodiment of the present invention.

FIG. 10 is a flowchart of a method for preparing a two-dimensional layer of an object during a three-dimensional printing of the object, according to an embodiment of the present invention. The process is used with the herein-disclosed descriptions of FIG. 1 through FIG. 8 as well as with other embodiments. In an operation 1001 a cross section image 1003 of the object is received, such as from well-known pre-printing procedures, which specifies the two-dimensional layer to be prepared. Typical cross-section ("slice") image formats include, but are not limited to: Scalable Vector Graphics (SVG), Windows Bitmap (BMP), and Portable Network Graphics (PNG) files. As noted, cross section image 1003 is typically prepared in a preprinting stage according to well-known methods. In an operation 1005 a thin layer of liquid polymer body material is deposited onto a transparent substrate per cross section image 1003. In an operation 1007, the liquid photopolymer layer is pressed against the object body under fabrication by bringing the transparent substrate into registration against the object body. In an operation 1009, the liquid photopolymer is cured by irradiation of projected light through the transparent substrate per cross section image 1003 to form a new solid layer on the object body. In an operation 1011 the transparent substrate is separated from the object body. In an operation 1013 any uncured photopolymer remaining on the transparent substrate is removed by wiping, and in an operation 1015, the new layer on the object body is post-cured by additional curing radiation. Operations 1013 can be performed simultaneously or in either order.

Figure 11:
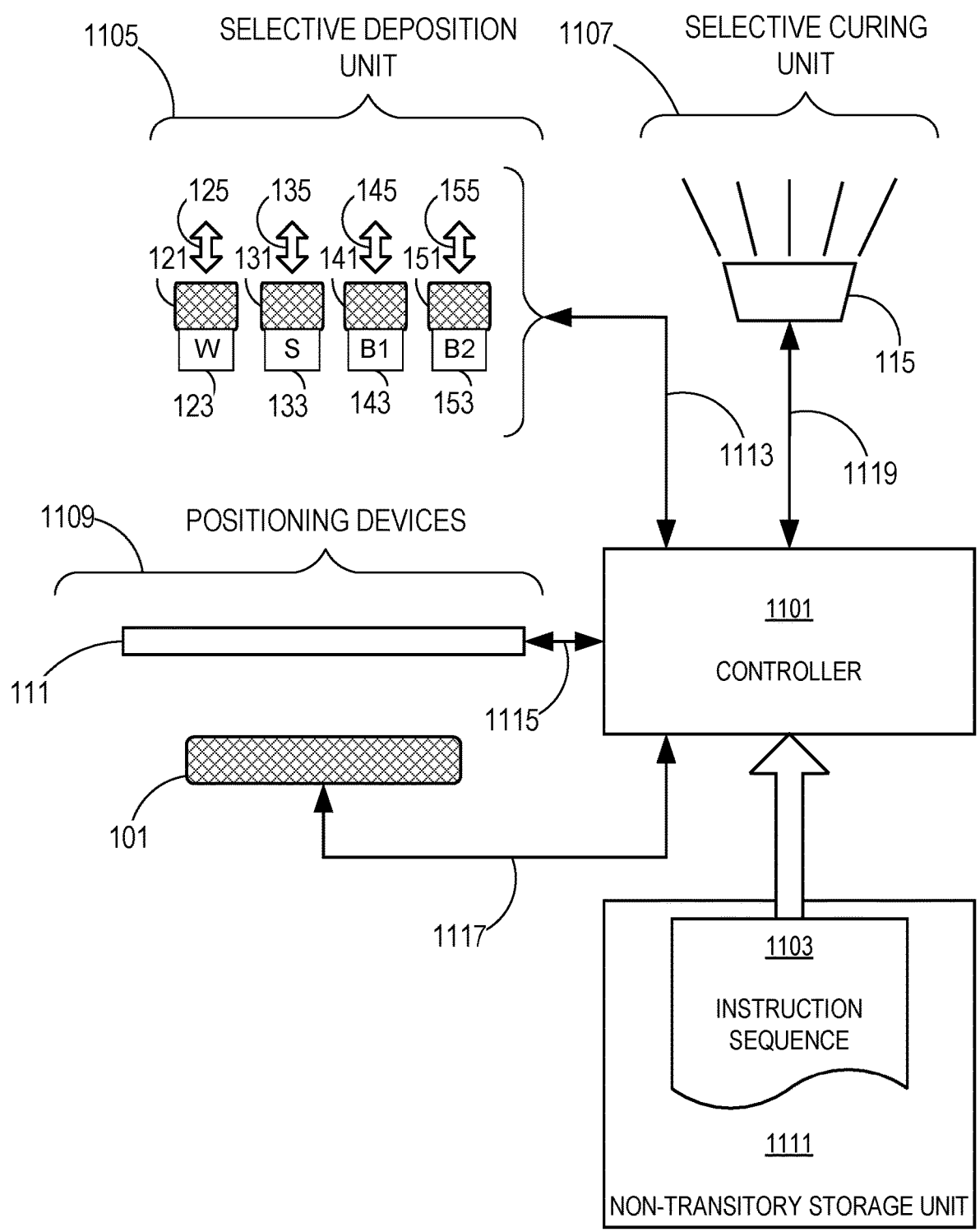
FIG. 11 is a conceptual block diagram of apparatus for preparing a two-dimensional layer of an object during a three-dimensional printing of the object, according to an embodiment of the present invention.

FIG. 11 is a conceptual block diagram of apparatus 1100 for preparing a two-dimensional layer of an object during a three-dimensional printing of the object, according to an embodiment of the present invention. Apparatus 1100 includes a controller 1101 and a non-transitory storage unit 1111 (non-limiting examples of which include random access memory, disk drive, CD ROM, and combinations of these and similar hardware devices) storing or containing an instruction sequence 1103 for controller 1101, to control:
- a selective deposition unit 1105 via signals sent over a signal path 1113;
- a selective curing unit 1107 via signals sent over a signal path 1119, and auxiliary positioning devices 1109, including:
  - transparent substrate 111 for receiving the selectively deposited layer of liquid body and support materials, which controller 1101 controls via signals sent over a signal path 1115; and
  - elevator platform 101, for suspending the object being fabricated at a specified vertical position relative to transparent substrate 111, which controller 1101 controls via signals sent over a signal path 1117.

In various embodiments of the present invention, controller 1101 controls the units and devices disclosed herein via one or more signals sent from controller 1101 over the respective signal paths as illustrated, and the units and devices carry out the indicated operations according to the one or more signals from controller 1101. The term "signal" herein denotes any control or command indication or group thereof, in any suitable format, analog or digital or combination thereof. In yet a further embodiment, controller 1101 not only controls selective deposition unit 1105, selective curing unit 1107, and positioning devices 1109, but also receives sensor input therefrom. In a related embodiment, sensor inputs are conveyed to controller 1101 as signals via the respective signal paths illustrated. In other related embodiments, signal paths are configured to carry a plurality of signals simultaneously (non-limiting examples of which include a serial bus and a parallel bus). In other embodiments, instructions stored in storage unit 1111 are executed to control mechanical elements of the system to perform methods as disclosed herein.

In a related embodiment, sequence 1103 contains machine-readable instructions stored in non-transitory storage unit 1111, such that when instruction sequence 1103 is executed by controller 1101, controller 1101 performs a method according to embodiments of the invention as disclosed herein, using selective deposition unit 1105, a selective curing unit 1107, and auxiliary positioning devices 1109. In certain embodiments of the invention, selective deposition unit 1105 includes elements such as actuators 121, 131, 141, and 151, wiper 123, support printer 133, first body material printer 143, and second body material printer 153 (FIG. 1). In related embodiments, selective curing unit 1107 includes projector 115 (FIG. 1). In further embodiments, controller 1101 is configured to execute instruction sequence 1103 to control mechanical elements of the system to perform methods as disclosed herein.

In a further embodiment; controller adjusts the position of transparent substrate 111 relative to selective deposition unit 1105. In still another embodiment; controller adjusts the position of transparent substrate 111 relative to selective curing unit 1107. In these embodiments, a relative position between two elements of the apparatus may be adjusted by moving either or both of the elements involved in the relative positioning.

According to embodiments of the invention, selective deposition unit 1105 is operative to selectively deposit body and support material on transparent substrate 111, and selective curing unit 1107 is operative to selectively cure body and support material according to a two-dimensional image of curing radiation projected by projector 115. In a related embodiment, positioning devices include elevator platform 101 and transparent substrate 111.

Various aspects of specific embodiments discussed herein may be combined with aspects from other embodiments. The present invention is not limited by what has been particularly shown and described herein, but rather the scope of the invention is defined by the appended claims.

The invention claimed is:

1. An apparatus for preparing a two-dimensional layer of a three-dimensional object during a three-dimensional printing of the object, wherein the three-dimensional object includes a body structure and a support structure, the apparatus comprising:
   - a controller;
   - a transparent substrate for receiving a deposited layer of liquid materials on an upper surface thereof;
   - a selective deposition unit that deposits at least one liquid body material and a liquid support material different from the at least one liquid body material, on the transparent substrate according to signals received from the controller; and
   - a selective curing unit that selectively solidifies, by curing irradiation, a portion of the deposited layer of liquid body materials on the transparent substrate according to signals received from the controller, such that some of the liquid body material remains uncured; and further comprising:
   - a non-transitory storage containing an instruction sequence which, when executed by the controller, causes the controller to:
   - receive two-dimensional image data of a cross section of the three-dimensional object, the image including a body region and a support region, wherein the support region is distinct from the body region;
   - send to the selective deposition unit signals for selectively depositing, on a transparent substrate, a layer that includes at least a first liquid photopolymer body material which covers and encloses the body region, and a liquid support material that is different from the first liquid photopolymer body material and which covers and encloses the support region; and
   - send to the selective curing unit signals for selectively solidifying the first liquid photopolymer body material by irradiating the layer with curing radiation through the transparent substrate according to the body region cross-section.

2. The apparatus of claim 1, further comprising a wiper that removes uncured liquid body material from the transparent substrate.

3. The apparatus of claim 1, wherein the selective curing unit comprises an ultraviolet image projector.

4. The apparatus of claim 1, wherein the selective curing unit comprises an ultraviolet laser.

5. The apparatus of claim 1, wherein the selective deposition unit deposits a plurality of different liquid body materials on the transparent substrate according to signals received from the controller.

6. An apparatus for preparing a two-dimensional layer of a three-dimensional object during a three-dimensional printing of the object, wherein the three-dimensional object includes a body structure and a support structure, the apparatus comprising:
  a controller;
  a transparent substrate for receiving a deposited layer of liquid materials on an upper surface thereof;
  a selective deposition unit that deposits at least one liquid body material and a liquid support material different from the at least one liquid body material, on the transparent substrate according to signals received from the controller; and
  a selective curing unit that selectively solidifies, by curing irradiation, a portion of the deposited layer of liquid body materials on the transparent substrate according to signals received from the controller, such that some of the liquid body material remains uncured,
  wherein the substrate is UV-transparent and the selective curing unit comprises a UV light projector for providing UV light, the apparatus further comprising:
  a non-transitory storage unit containing machine-readable instructions, which instructions, when executed by the controller, cause the controller to:
    receive two-dimensional image data of a cross section of the three-dimensional object, the image including a body region and a support region, wherein the support region is distinct from the body region;
    send to the selective deposition unit signals for selectively depositing, on a transparent substrate, a layer that includes at least a first liquid photopolymer body material which covers and encloses the body region, and a liquid support material that is different from the first liquid photopolymer body material and which covers and encloses the support region; and
    send to the selective curing unit signals for selectively solidifying the first liquid photopolymer body material by irradiating the layer with curing radiation through the transparent substrate according to the body region cross-section.

7. The apparatus of claim 6, further comprising a wiper that removes uncured liquid body material from the transparent substrate.

8. The apparatus of claim 6, wherein the UV light projector comprises an ultraviolet image projector.

9. The apparatus of claim 6, wherein the UV light projector comprises an ultraviolet laser.

10. The apparatus of claim 6, wherein the deposition unit deposits a plurality of different liquid body materials on the UV-transparent substrate according to signals received from the controller.

11. The apparatus of claim 1, further comprising an elevator platform to provide a surface on which a fabricated object is formed.

12. The apparatus of claim 11, wherein the elevator platform is moveable vertically in controlled distance increments.

13. The apparatus of claim 11, wherein the transparent substrate is moveable in a direction to allow for proper positioning of said substrate and the deposited layer under the fabricated object being formed.

14. The apparatus of claim 11, wherein the elevator platform is configured to be lowered in a direction to bring the fabricated object being formed into contact and correct alignment with a layer deposited on the transparent substrate.

15. The apparatus of claim 6, further comprising an elevator platform to provide a surface on which a fabricated object is formed.

16. The apparatus of claim 15, wherein the elevator platform is moveable vertically in controlled distance increments.

17. The apparatus of claim 15, wherein the transparent substrate is moveable in a direction to allow for proper positioning of said substrate and the deposited layer under the fabricated object being formed.

18. The apparatus of claim 15, wherein the elevator platform is configured to be lowered in a direction to bring the fabricated object being formed into contact and correct alignment with a layer deposited on the transparent substrate.

* * * * *